United States Patent
Ooyanagi

(10) Patent No.: US 9,978,005 B2
(45) Date of Patent: May 22, 2018

(54) PRINTER FOR DRAWING BOLD CHARACTER, METHOD FOR CONTROLLING THE SAME, AND STORAGE MEDIUM

(71) Applicant: CANON KABUSHIKI KAISHA, Tokyo (JP)

(72) Inventor: Maho Ooyanagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/234,450

(22) Filed: Aug. 11, 2016

(65) Prior Publication Data

US 2017/0053194 A1    Feb. 23, 2017

(30) Foreign Application Priority Data

Aug. 17, 2015    (JP) .................. 2015-160541

(51) Int. Cl.
| | |
|---|---|
| *G06F 15/00* | (2006.01) |
| *G06K 15/02* | (2006.01) |
| *H04N 1/387* | (2006.01) |
| *H04N 1/00* | (2006.01) |
| *H04N 1/56* | (2006.01) |
| *H04N 1/58* | (2006.01) |

(52) U.S. Cl.
CPC ....... *G06K 15/184* (2013.01); *H04N 1/00204* (2013.01); *H04N 1/00344* (2013.01); *H04N 1/3872* (2013.01); *H04N 1/56* (2013.01); *H04N 1/58* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,289,170 A | * | 2/1994 | Fujii | ...................... G06K 15/02 345/469.1 |
| 2005/0243368 A1 | * | 11/2005 | Sedky | ................... G06F 3/1203 358/1.16 |
| 2011/0188062 A1 | * | 8/2011 | Sweet | .................... G06K 15/02 358/1.13 |

FOREIGN PATENT DOCUMENTS

| | | |
|---|---|---|
| JP | 10-313410 A | 11/1998 |
| WO | WO2015121962 | * 2/2014 |

* cited by examiner

*Primary Examiner* — Barbara Reinier
(74) *Attorney, Agent, or Firm* — Canon U.S.A., Inc. IP Division

(57) ABSTRACT

A printer includes a receiving unit configured to receive data for drawing a character at a predetermined drawing position, and a drawing unit configured to, based on the data for drawing the character, draw the character multiple times by varying a drawing position of the character each time. The drawing performed multiple times includes at least drawing at the predetermined drawing position, drawing at a drawing position shifted from the predetermined drawing position only in a horizontal direction, and drawing at a drawing position shifted from the predetermined drawing position only in a vertical direction.

25 Claims, 6 Drawing Sheets

PRINTER FOR DRAWING BOLD CHARACTER, METHOD FOR CONTROLLING THE SAME, AND STORAGE MEDIUM

BACKGROUND OF THE INVENTION

Field of the Invention

The present invention relates to a technique for a bold process on a character.

Description of the Related Art

To cause a character to seem bolder, there is a bold process on a character. The publication of Japanese Patent Application Laid-Open No. 10-313410 discusses a technique for performing a bold process on a character by performing, on a character represented by a bitmap, a process of identifying a pixel adjacent to the character and changing the pixel to the color of the character.

To identify a pixel adjacent to the character, the technique in the publication of Japanese Patent Application Laid-Open No. 10-313410 performs, on each pixel in the bitmap, the process of determining whether the pixel is adjacent to the character. Since this determination process is performed on each pixel, the cost of the determination process increases in proportion to the size of the bitmap representing the character.

SUMMARY OF THE INVENTION

The present invention is directed to a bold process on a character that eliminates the need for a determination process on each pixel.

According to an aspect of the present invention, a printer includes a receiving unit configured to receive data for drawing a character at a predetermined drawing position, and a drawing unit configured to, based on the data for drawing the character, draw the character multiple times by varying a drawing position of the character each time, wherein the drawing performed multiple times includes at least drawing at the predetermined drawing position, drawing at a drawing position shifted from the predetermined drawing position only in a horizontal direction, and drawing at a drawing position shifted from the predetermined drawing position only in a vertical direction.

Further features of the present invention will become apparent from the following description of exemplary embodiments with reference to the attached drawings.

DESCRIPTION OF THE EMBODIMENTS

With reference to the drawings, exemplary embodiments of a printing system will be described below. The following exemplary embodiments do not limit the invention according to the appended claims, and not all the combinations of the features described in the exemplary embodiments are essential for a method for solving the problems in the invention.

<Configuration of Printing System>

Figure 1:
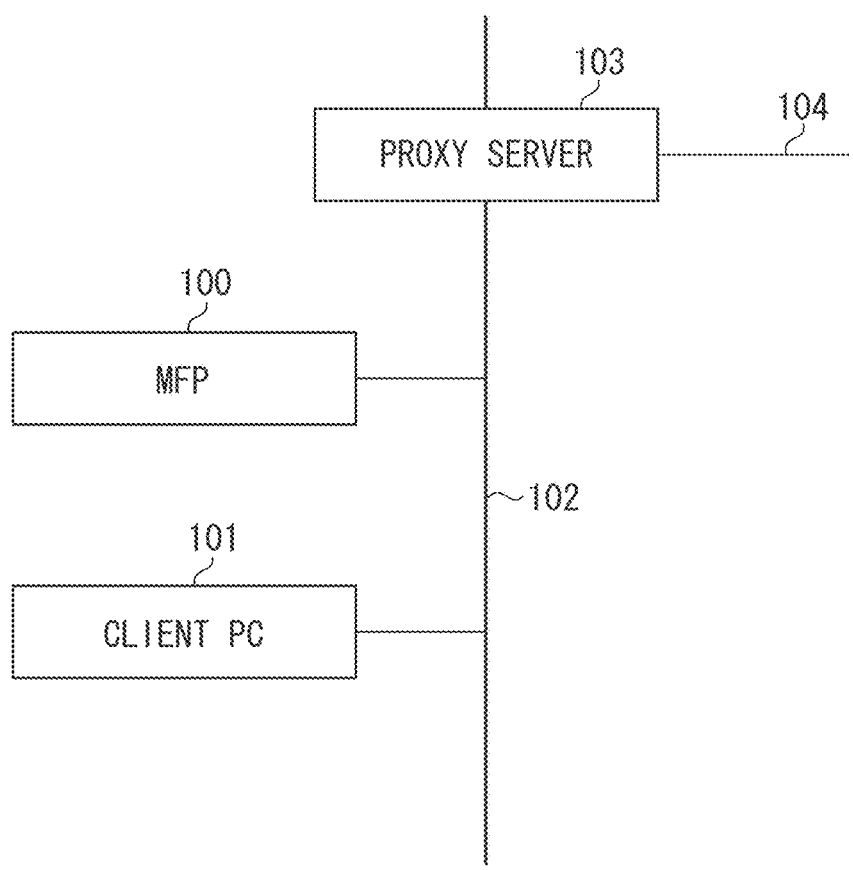
FIG. 1 is a schematic diagram illustrating a configuration of a character processing system according to a first exemplary embodiment.

FIG. 1 is a block diagram illustrating a configuration of an image processing system, which is an example of a character processing system.

In FIG. 1, a local area network (LAN) 102, which is constructed in an office, connects a multifunction peripheral (MFP) 100, which achieves a plurality of types of functions (a copy function, a print function, and a transmission function), and a client personal computer (PC) 101. The MFP 100 is an example of a character processing apparatus. The LAN 102 is also connected to a proxy server 103. Further, the proxy server 103 is connected to a network 104 such as the Internet. The client PC 101 transmits print data to the MFP 100 and thereby can cause the MFP 100 to perform printing based on the print data. The system configuration illustrated in FIG. 1 is an example.

Figure 2:
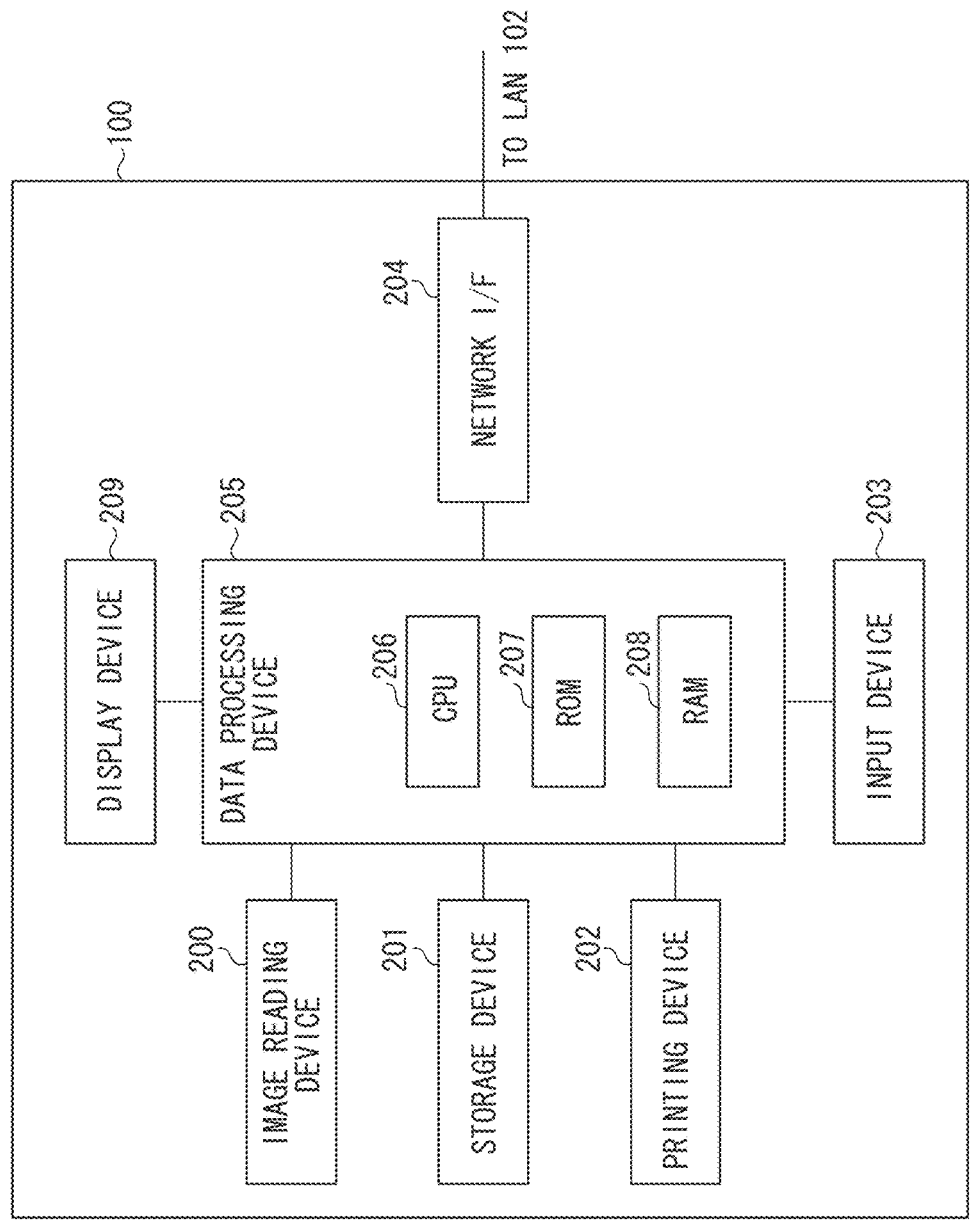
FIG. 2 is a block diagram illustrating an example of a configuration of a multifunction peripheral (MFP) according to the first exemplary embodiment.

FIG. 2 is a block diagram illustrating an example of the configuration of the MFP 100 in FIG. 1. In FIG. 2, the MFP 100 includes an image reading device 200, a storage device 201, a printing device 202, an input device 203, a network interface (I/F) 204, a data processing device 205, and a display device 209. The devices and the network I/F 204 are connected to the data processing device 205, and the data processing device 205 performs overall control thereof.

The image reading device 200 is an optical scanner, and optically reads a document placed on a document platen, thereby inputting raster data (bitmap image data) to the data processing device 205.

The storage device 201 is a hard disk drive (HDD), and is a readable and writable non-volatile storage medium. The storage device 201 stores raster data generated by the image reading device 200, page description language (PDL) data received from a printer driver of the client PC 101 via the LAN 102, and raster data (bitmap image data) obtained by the data processing device 205 rendering (rasterizing) the PDL data. The PDL data is occasionally termed drawing data.

The printing device 202 is a printer or a printer engine, and prints an image on a sheet such as paper based on raster data input from the data processing device 205.

The input device 203 is a touch panel, a keyboard, or a mouse, receives an operation input from a user, and sends information of the received operation input to the data processing device 205.

The network I/F 204 transmits or receives data to or from a separate external apparatus via the LAN 102.

The data processing device 205 performs overall control of the devices and the network I/F 204 described above, thereby controlling the entirety of the MFP 100. The data processing device 205 includes a central processing unit (CPU) 206 serving as a processor, a read-only memory (ROM) 207 serving as a non-volatile memory, and a random-access memory (RAM) 208 serving as a volatile memory. The ROM 207 stores a data processing program. The CPU 206 loads the program from the ROM 207 into the RAM 208 and executes the program, thereby achieving data processing described below. In a first exemplary embodiment, the processing performed by the data processing device 205 is executed by the CPU 206.

The display device 209 is a liquid crystal display (LCD), and can display a state of an operation input provided by the user through the input device 203.

When the MFP 100 executes the copy function, the data processing device 205 performs image processing on bitmap image data obtained by the image reading device 200, and inputs the bitmap image data subjected to the image processing to the printing device 202. At this time, the bitmap image data is converted by an interface (not illustrated) into a recording signal that can be processed by the printing device 202. Then, the printing device 202 prints an image on a sheet.

Further, based on the PDL data received from the client PC 101 (the printer driver) via the LAN 102, the MFP 100 generates bitmap image data, and prints an image representing the bitmap image data by the printing device 202.

<Description of Processing of Present Exemplary Embodiment>

Figure 3:
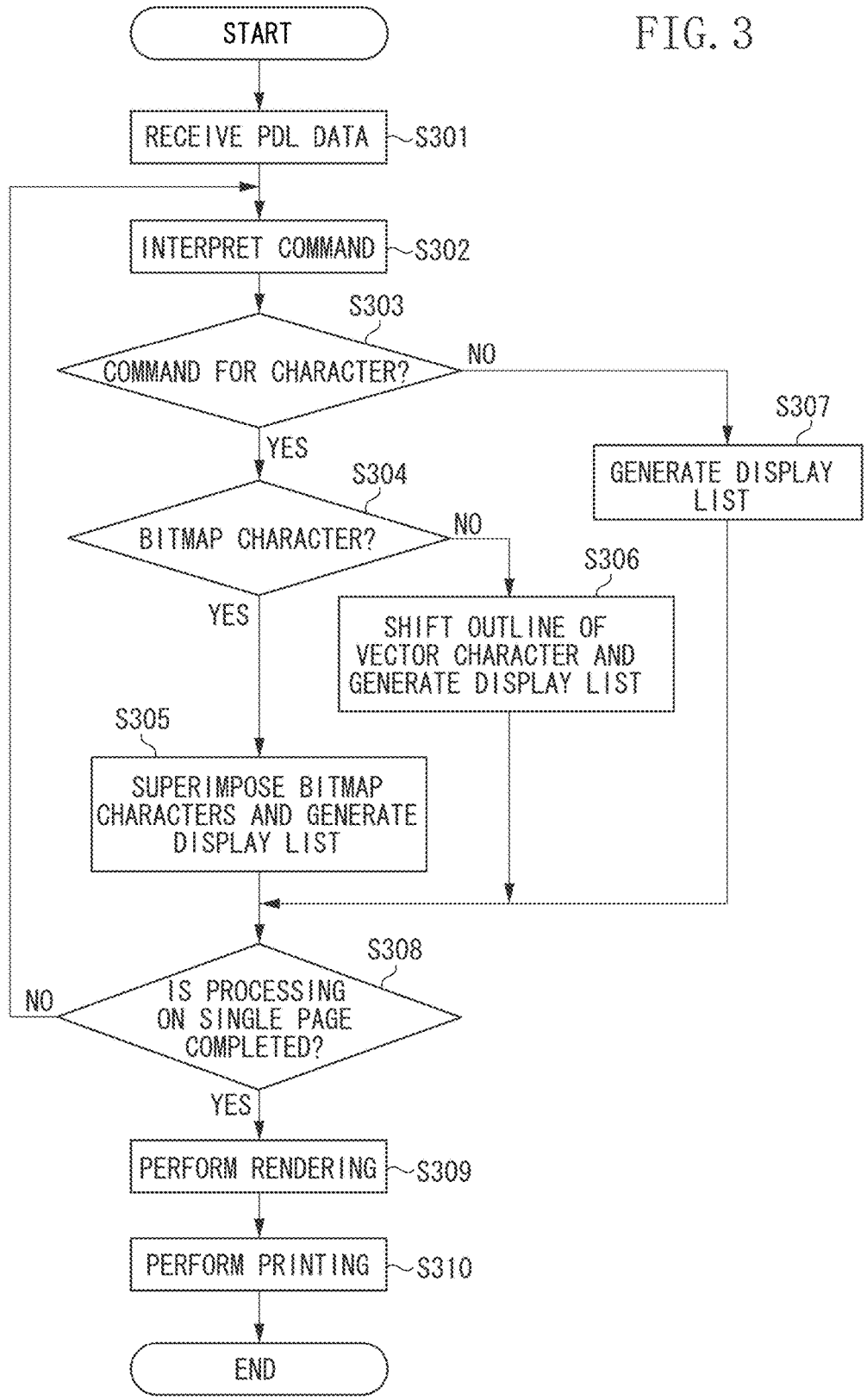
FIG. 3 is a flowchart of processing according to the first exemplary embodiment.

With reference to FIG. 3, an image printing process executed by the MFP 100 is described. A flowchart illustrated in FIG. 3 is achieved by the CPU 206 executing a program stored in the ROM 207. That is, processing of the flowchart in FIG. 3 is executed by the CPU 206 controlling the components of the MFP 100 according to the program.

In step S301 of FIG. 3, the data processing device 205 receives PDL data from the PC 101 via the network I/F 204. The PDL data is obtained by the printer driver converting a document created by the PC 101 executing an application.

In step S302, the data processing device 205 acquires a drawing command from the received PDL data and interprets the content of the drawing command. At this time, the data processing device 205 functions as an interpreter for interpreting the PDL data.

In step S303, the data processing device 205 determines whether the drawing command interpreted in step S302 is a drawing command for a character (data for drawing a character: character data). If the interpreted drawing command is a drawing command for a character (YES in step S303), the processing proceeds to step S304. The determination as to whether the interpreted drawing command is a drawing command for a character can be made based on whether a character code is specified, or whether a character attribute flag is assigned. If, on the other hand, the interpreted drawing command is not a drawing command for a character but a drawing command for graphics or an image (NO in step S303), the processing proceeds to step S307. In a case of a drawing command specifying vector data to which a character attribute flag is not assigned, it is determined that the interpreted drawing command is a drawing command for graphics. In a case of a drawing command specifying a multivalued bitmap image, it is determined that the interpreted drawing command is a drawing command for an image.

In step S304, the data processing device 205 determines whether the drawing command for a character is used to draw a bitmap character. If the drawing command for a character is used to draw a bitmap character (YES in step S304), the processing proceeds to step S305. If not (NO in step S304), the processing proceeds to step S306.

A bitmap character is a character provided by bitmap image data. The bitmap image data may be binary or multivalued. In the present exemplary embodiment, it is determined that the drawing command for a character is used to draw a bitmap character in the following two cases. One is a case where the drawing command specifies a bitmap character included in the PDL data. The other is a case where the drawing command is given in a character code and specifies bitmap image data provided in advance in the storage device 201.

In step S305, the data processing device 205 acquires a bitmap character and a drawing position specified by the drawing command. Then, based on the bitmap character and the drawing position, the data processing device 205 draws the bitmap character by overwriting (combining) multiple times by varying the drawing position of the bitmap character each time, thereby obtaining a new combined bitmap character. This is a bold process on a character represented by a bitmap.

This combining process is a relatively simple process in which a character is combined multiple times. Thus, the bold process using this combining process is faster than a bold process for performing on each pixel a determination process for identifying a pixel adjacent to a character and changing the identified pixel to the color of the character. The method for combining a character in this combining process will be described in detail with reference to FIGS. 4 and 5.

The data processing device 205 generates an intermediate code (a display list (DL)) of the combined bitmap character. The display list includes the drawing position specified by the drawing command. The processing proceeds to step S308.

In step S306, the data processing device 205 acquires an outline of a vector character. Then, the data processing device 205 performs a bold process on the vector character by shifting the position of the acquired outline. Further, the data processing device 205 generates a display list of the vector character subjected to the bold process. The display list includes the drawing position specified by the drawing command. The processing proceeds to step S308.

In step S307, the data processing device 205 generates a display list of the drawing command interpreted in step S302 without performing the bold process. For example, even if the drawing command specifies vector data, the data processing device 205 generates a display list without performing the bold process on the vector data. The display list includes the drawing position specified by the drawing command. The processing proceeds to step S308.

In step S308, the data processing device 205 determines whether a drawing command for a single page is interpreted and a display list for the single page is generated. If the processing on the single page is completed (YES in step S308), the processing proceeds to step S309. If the processing on the single page is not completed (NO in step S308), the processing returns to step S302.

In step S309, the data processing device 205 performs rendering (rasterization) based on the generated display list for the single page. In the rendering, if the display list specifies a bitmap character, the data processing device 205 draws the combined bitmap character generated in step S305 at the drawing position specified in the display list. If the display list specifies a vector character, the data processing device 205 converts the vector character subject to the bold process in step S306 into bitmap data, and draws the resulting bitmap character at the specified drawing position. Further, if the display list specifies graphics, the data processing device 205 converts the graphics into bitmap data, and draws the resulting bitmap character at the specified drawing position. Furthermore, if the display list specifies a multivalued bitmap image, the data processing device 205 draws the multivalued bitmap image at the specified drawing position. As described above, the data processing device 205 generates a bitmap image for the single page.

In step S310, the data processing device 205 transmits the generated bitmap image for the single page to the printing device 202, and the printing device 202 prints the image on a sheet.

<Process of Superimposing Bitmap Characters>

Figure 4:
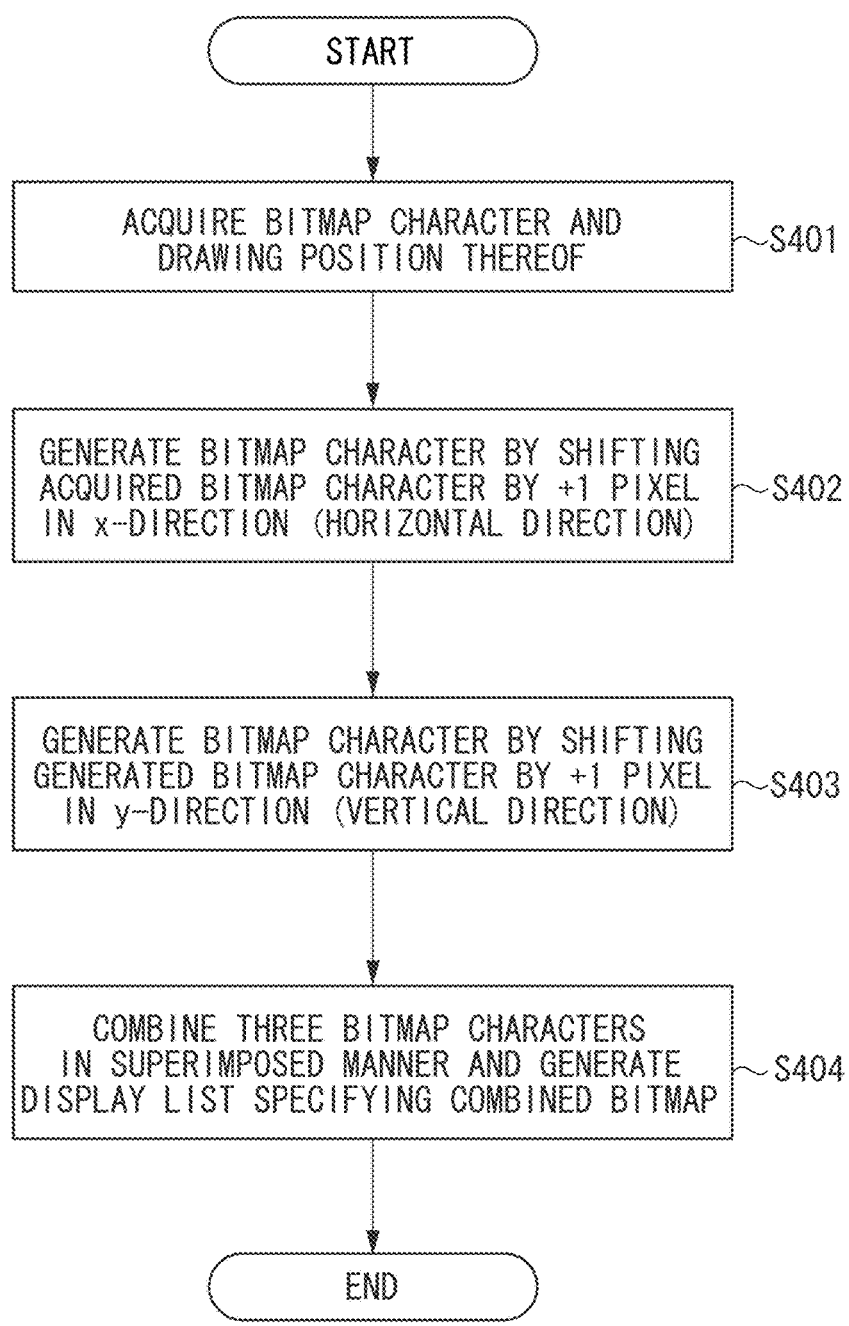
FIG. 4 is a flowchart of generation of a display list of a bitmap character in the first exemplary embodiment.
Figure 5:
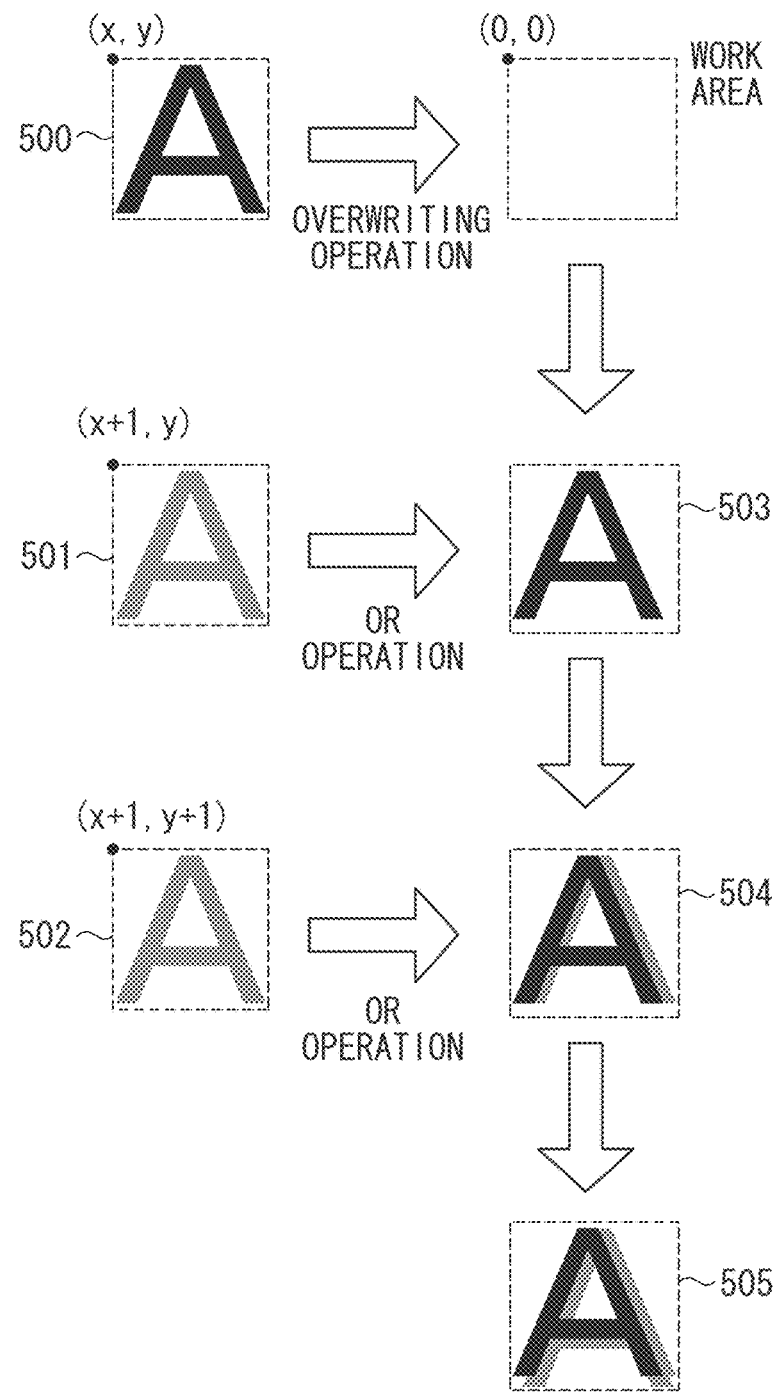
FIG. 5 is a diagram illustrating a superimposition combining process.

Now, with reference to a flowchart in FIG. 4 and FIG. 5, a process of creating a display list of a bitmap character is described.

In step S401, the data processing device 205 acquires a bitmap character and a drawing position of the bitmap character. The data processing device 205 also acquires color information (density) of the bitmap character. For example, it is assumed that the acquired bitmap character is a bitmap character 500 in FIG. 5, a drawing position of the bitmap character 500 is (x, y), and the bitmap character 500 has a density of 100% (which corresponds to a density value of 255 in values from 0 to 255).

In step S402, the data processing device 205 generates a bitmap character by shifting the bitmap character acquired in step S401 by a first predetermined distance (+1 pixel) in the x-direction. That is, a bitmap character at a drawing position (x+1, y) is generated. If the density of this shifted bitmap character is determined as a density equal to the acquired density, it is possible to obtain an effect of causing the character to seem bolder. If, on the other hand, the density of this shifted bitmap character is determined as a density lower than the acquired density, it is possible to obtain the effect of causing the character to seem bold while adjusting an extent of the effect of causing the character to seem bold. In the example of FIG. 5, a bitmap character 501 having a density of 50%, which is obtained by reducing the density of the bitmap character 500 by half, is generated.

Then, in step S403, the data processing device 205 generates a bitmap character by further shifting the bitmap character generated in step S402 by a second predetermined distance (+1 pixel) in the y-direction. That is, a bitmap character at a drawing position (x+1, y+1) is generated. The density of this bitmap character is equal to that of the bitmap character generated in step S402. In the example of FIG. 5, a bitmap character 502 having a density of 50% is generated.

That is, in steps S402 and S403, the data processing device 205 generates two copies of the original bitmap character acquired in step S401 that are different in their drawing positions from the original bitmap character.

In step S404, the data processing device 205 combines the three bitmap characters obtained in steps S401 to S403 in a superimposed manner. First, the data processing device 205 draws by overwriting (i.e., pastes) the bitmap character acquired in step S401 in a work area reserved on the RAM 208. This overwriting is performed at a position corresponding to the drawing position (x, y). For example, it is assumed that the overwriting is performed at a position (0, 0) in the work area. Next, the data processing device 205 draws the bitmap character generated in step S402 in the work area by an OR operation. The OR operation refers to arithmetic processing for writing back a logical disjunction of already drawn data and a drawing target bitmap to the work area. At this time, the drawing position in the work area is (1, 0) and corresponds to the drawing position (x+1, y). Then, the data processing device 205 draws the bitmap character generated in step S403 in the work area by the OR operation. At this time, the drawing position in the work area is (1, 1) and corresponds to the drawing position (x+1, y+1). The drawing of each bitmap character in the work area includes the overwriting of data of the bitmap character in the work area. Further, even in a case where a writing destination of the bitmap character is not present in the work area (e.g., in a case where the bitmap character is directly written to a frame buffer), this writing is referred to as "the drawing of the bitmap character".

The reason for drawing the bitmap character by overwriting at the first time as described above is that it is possible to perform drawing at high speed without referencing data in the work area as in the OR operation. Alternatively, the bitmap character may be drawn by the OR operation at the first time.

In the above description, in step S404, three bitmap characters are combined together. Alternatively, in each of steps S401, S402, and step S403, a bitmap character may be drawn in the work area each time. Consequently, it is possible to reduce the amount of memory used to temporarily hold three bitmap characters. Yet alternatively, three bitmap characters may not be obtained, but the bitmap character acquired in step S401 may be repeatedly combined in a superimposed manner multiple times. In this case, the drawing position is varied every time the bitmap character is combined.

The method for combining bitmap characters in a superimposed manner may be another method. For example, the bitmap character in step S403 may be overwritten, the bitmap character in step S402 may be overwritten on the resulting character, and the bitmap character in step S401 may be further overwritten on the resulting character. That is, pasting each bitmap character by changing a pasting position of the bitmap character is also included in the category of the drawing in the present exemplary embodiment. Instead of the method for thus overwriting the bitmap character in step S403, the bitmap character in step S402, and the bitmap character in step S401 in a superimposed manner in this order, the following method may be employed. That is, if these bitmap characters have overlapping portions, the drawing of the overlapping portions is omitted.

As described above, the data processing device 205 obtains a combined bitmap (a drawing result), generates a display list specifying the combined bitmap as a bitmap character, and ends this processing flow.

In the above exemplary embodiment, bitmap characters are combined in a superimposed manner. Alternatively, the data processing device 205 may acquire the number of points of a character specified by a drawing command, and combine, in a superimposed manner, only a bitmap character of which the number of points is less than a threshold. That is, the data processing device 205 performs the process of step S307 on a bitmap character of which the number of points is equal to or greater than the threshold and which is other than a small character. On the other hand, the data processing device 205 performs the process of step S305 on a bitmap character of which the number of points is less than the threshold and which is a small character. This is because it is necessary to make a small character bold, whereas it may be less necessary to make a character other than a small character bold.

Further, only when the user gives an instruction through the input device 203, the data processing device 205 may perform the process of step S305 on a bitmap character. That is, if the user does not give an instruction to perform the bold process, the process of step S307 is performed even in a case of a command for a character.

Furthermore, even in a case of a command for a bitmap character, the processing may be switched depending on a font of the character (a Gothic typeface, a Ming typeface, etc.), or the type of the character (hiragana, katakana, Hangul, an alphabetical letter, a Chinese character, etc.). For example, in a case of a Ming typeface, the processes of steps S305 and S306 are performed. In a case of a Gothic typeface, the process of step S307 is performed instead of the process of step S305 or S306. For example, in a case of hiragana, katakana, Hangul, or an alphabetical letter, the processes of steps S305 and S306 are performed. In a case of a Chinese character, the process of step S307 is performed instead of the process of step S305 or S306.

The densities of bitmap characters to be generated in steps S402 and S403 may be able to be specified by the user, depending on properties of the printing device 202. For example, in a case where an image is to be printed by the printing device 202 for printing a character thinly, the user may set the densities of bitmap characters to be generated in steps S402 and S403 not to half (50% of) but to 80% of the density of the bitmap character acquired in step S401.

In the processing of the above first exemplary embodiment, three bitmap characters obtained from a bitmap character obtained from a drawing command for a single bitmap character are combined when a display list is generated. Alternatively, another exemplary embodiment may be employed. For example, a similar effect (a bold effect of a character) can be obtained also by generating a display list of each of the three bitmap characters and rendering these three display lists by an appropriate drawing method such as the above overwriting or OR operation.

In a second exemplary embodiment, the bold process on a character is varied depending on a font type of the character. The present exemplary embodiment is different from the first exemplary embodiment in that the process of step S305 in the first exemplary embodiment is replaced with processing of a flowchart in FIG. 6. The rest of the configuration of the present exemplary embodiment is similar to that of the first exemplary embodiment.

Figure 6:
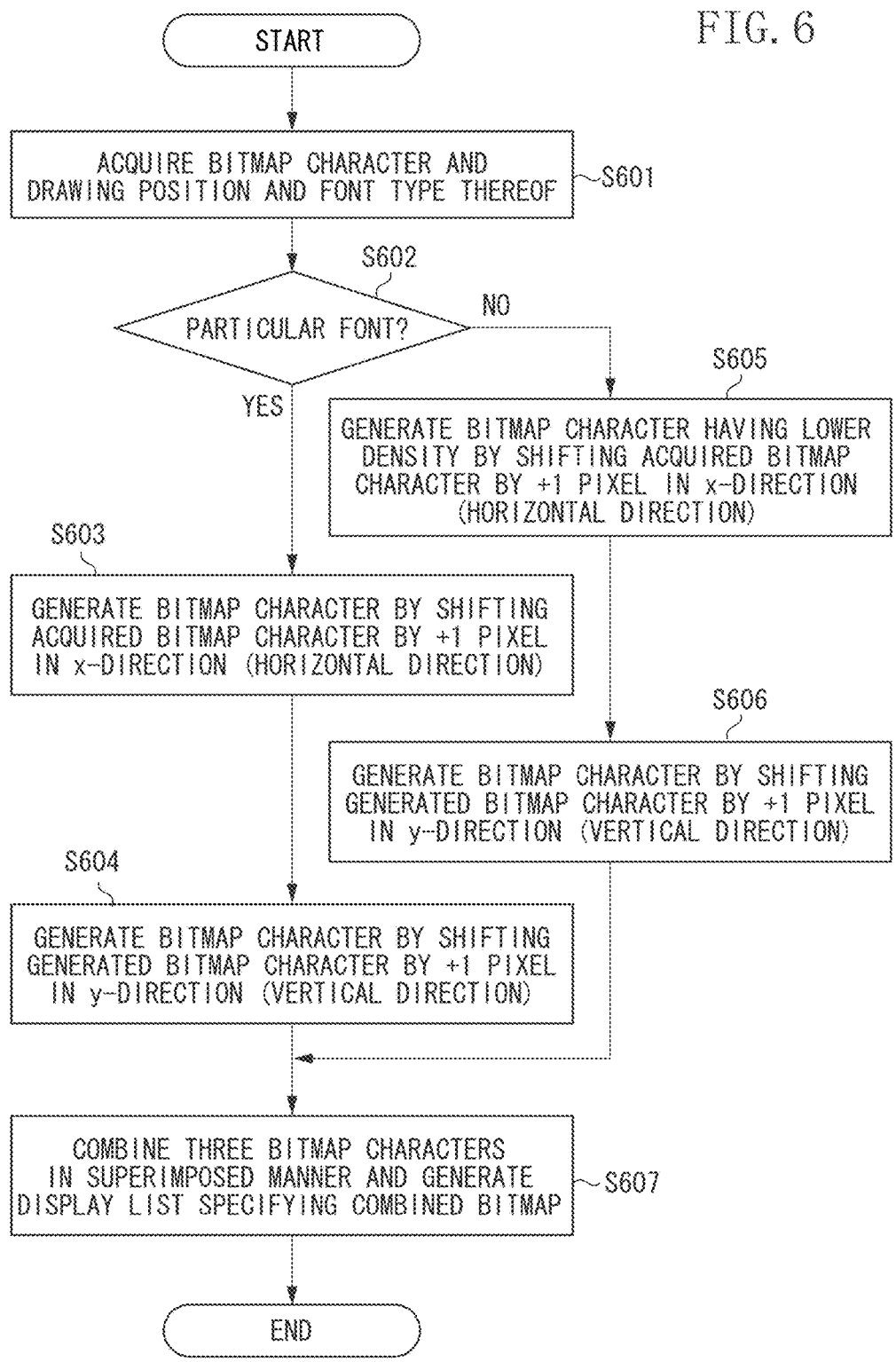
FIG. 6 is a flowchart of generation of a display list of a bitmap character in a second exemplary embodiment.

The processing of the flowchart in FIG. 6 is described.

A process of step S601 is different from the process of step S401 in the first exemplary embodiment in that the data processing device 205 further acquires a font type of the character as information of the drawing command.

In step S602, the data processing device 205 determines whether the font type acquired in step S601 is a particular font. If the acquired font type is a particular font (YES in step S602), the processing proceeds to step S603. If not (NO in step S602), the processing proceeds to step S605. The particular font is a font in which an element forming a character has a remarkably thin portion, such as a horizontal line in a Ming typeface. In the case of such a font, it is desirable to cause the character seem bolder to improve the readability of the character for the user. Otherwise, if the character is made too bold, the readability of the character is reduced on the contrary.

In response, the bold process is performed on a character in a particular font to cause the character to seem bolder than a character not in a particular font. As an example of this bold process, steps S603, S604, S605, and S606 are described.

In step S603, the data processing device 205 generates a bitmap character having a density equal to that of the bitmap character acquired in step S601 by shifting the acquired bitmap character by +1 pixel in the x-direction.

In step S604, the data processing device 205 generates a bitmap character by shifting the bitmap character generated in step S603 (which has a density equal to that of the bitmap character acquired in step S601) by +1 pixel in the y-direction.

On the other hand, in step S605, the data processing device 205 generates a bitmap character having a density half that of the bitmap character acquired in step S601 by shifting the acquired bitmap character by +1 pixel in the x-direction.

In step S606, the data processing device 205 generates a bitmap character by shifting the bitmap character generated in step S605 (which has a density half that of the bitmap character acquired in step S601) by +1 pixel in the y-direction.

The process of step S607 is similar to the process of step S404 in the first exemplary embodiment.

In steps S601, S603, and S604, if the font type is a particular font, the densities of the three bitmap characters to be superimposed are equal, and the bitmap character is drawn more clearly.

Further, in steps S601, S605, and S606, if the font type is not a particular font, the original bitmap character is edged at a low density. Thus, it is possible to obtain an effect of making the character bold without reducing the readability on the contrary.

In the above processing, in step S602, the processing is switched between a particular font and a font that is not a particular font. Alternatively, another exemplary embodiment may be employed. For example, in step S601, the data processing device 205 may further acquire information of a size (the number of points) of the character. Then, in step S602, the data processing device 205 may determine whether the number of points is less than a threshold. In this case, the data processing device 205 operates so that the processes of steps S603 and S604 are performed on a bitmap character of which the number of points is equal to or greater than the threshold and which is not a small character. On the other hand, the data processing device 205 operates so that the processes of steps S605 and S606 are performed on a bitmap character of which the number of points is less than the threshold and which is a small character. This is because a small character is edged at a low density, whereby it is possible to print even the character having a complicated shape without filling the blank space between elements forming the character. That is, it is possible to obtain the effect of preventing a character from being damaged, while making the character bold.

According to the above exemplary embodiments, it is possible to perform the bold process on a character without performing on each pixel a determination process for identifying a pixel adjacent to a character.

In the above exemplary embodiments, in step S306, the data processing device 205 performs the bold process on a vector character by shifting an outline of the vector character. Alternatively, the following processing may be executed instead of this method. The data processing device 205 may rasterize the vector character to obtain a bitmap character. Then, the data processing device 205 may perform a process similar to that of step S305.

In the above exemplary embodiments, in step S305, bitmap characters are combined. Then, in step S309, a new bitmap character obtained by combining the bitmap characters is drawn on a page. Alternatively, the following processing may be performed. In step S305, the data processing device 205 generates one or more drawing commands from the drawing command for the bitmap character by rewriting (varying) only a drawing position specified by the drawing command. That is, a plurality of drawing commands specifying drawing positions different from each other are generated for the same character. Each of the plurality of drawing commands is converted into an intermediate code. Then, in step S309, based on the plurality of intermediate codes, the data processing device 205 draws on a page the same character at the drawing positions different from each other.

In the above exemplary embodiments, the MFP 100 performs the bold process on a bitmap character. Alternatively, the system configuration may be such that the client PC 101 performs the bold process on a bitmap character described in the above exemplary embodiments and transmits the bitmap character subjected to the bold process as a drawing command of PDL data to the MFP 100, and the MFP 100 renders and prints the bitmap character. That is, the printer driver receives data from application software operating on the client PC 101 and determines a drawing command for a character included in the data. Then, the printer driver performs the above bold process on the character and then transmits PDL data including the character as a drawing command in a PDL to the MFP 100.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-160541, filed Aug. 17, 2015, which is hereby incorporated by reference herein in its entirety.

What is claimed is:

1. A printer comprising:
    a printing device;
    a network interface configured to receive data for drawing a character, wherein the data for drawing the character is a drawing command described in a page description language; and
    a data processing unit including at least one processor and a memory storing instructions executed by the at least one processor, wherein the data processing unit acts as:
        a drawing unit configured to, based on the data for drawing the character, draw the character multiple times by varying a drawing position of the character each time,
        wherein the drawing performed multiple times includes at least drawing at a first drawing position, drawing at a second drawing position different from the first drawing position in a horizontal direction only, and drawing at a third drawing position different from the first drawing position in a vertical direction only;
        a conversion unit configured to convert a drawing result obtained by performing the drawing multiple times into display list data; and
        a rasterization unit configured to perform rasterization based on at least the display list data to generate a raster image of a page printed by the printing device.

2. The printer according to claim 1, wherein characters obtained by drawing the character multiple times overlap each other.

3. A printer comprising:
    a printing device;
    a data processing unit including at least one processor and a memory storing instructions executed by the at least one processor, wherein the data processing unit acts as:
        an acquisition unit configured to acquire data for drawing a character, wherein the data for drawing the character is a drawing command described in a page description language;
        a drawing unit configured to, based on the data for drawing the character, draw the character multiple times at drawing positions different from each other,
        wherein the plurality of different drawing positions include at least a first drawing position, a second drawing position different from the first drawing position in a horizontal direction only, and a third drawing position different from the first drawing position in a vertical direction only; and
        a conversion unit configured to convert a drawing result obtained by performing the drawing multiple times into display list data; and
        a rasterization unit configured to perform rasterization based on at least the display list data to generate a rasterized page printed by the printing device.

4. The printer according to claim 3, wherein the plurality of characters at the drawing positions different from each other overlap each other.

5. The printer according to claim 1, wherein the drawing unit draws a character by writing data representing the character.

6. The printer according to claim 1, wherein, in order to draw the character multiple times, the drawing unit is configured to:
    based on the data for drawing the character, acquire a bitmap character representing the character; and
    draw the acquired bitmap character multiple times by adjusting a drawing position of the acquired bitmap character each time, the adjusted drawing position being one of the first drawing position, the second drawing position, and the third drawing position.

7. The printer according to claim 1, wherein, in order to draw the character multiple times, the drawing unit is configured to:
    based on the data for drawing the character, acquire a bitmap character representing the character to be drawn at the first drawing position;

based on the data for drawing the character, acquire a bitmap character representing the character to be drawn at the second drawing position;

based on the data for drawing the character, acquire a bitmap character representing the character to be drawn at the third drawing position; and draw the three acquired bitmap characters.

8. The printer according to claim 1, wherein the drawing unit determines whether a size of the character to be drawn based on the data for drawing the character is less than a threshold, and performs the drawing multiple times based on a drawing command in which the size of the character is less than the threshold according to the determination.

9. The printer according to claim 1, wherein the drawing unit draws the character having a first density at least once in the drawing performed multiple times, and draws the character having a second density different from the first density at least once in the drawing performed multiple times.

10. The printer according to claim 9,
wherein the first density is determined based on color information specified by the data for drawing the character, and
wherein the second density is a density lower than the first density.

11. The printer according to claim 9, wherein the drawing unit determines whether to draw the character having the first density and the character having the second density based on a font of the character.

12. The printer according to claim 9, wherein the drawing unit determines whether to draw the character having the first density and the character having the second density based on a size of the character.

13. The printer according to claim 9, wherein the drawing unit determines whether to draw the character having the first density and the character having the second density based on a type of the character.

14. The printer according to claim 1, further comprising a printing device configured to print the rasterized page which includes a drawing result obtained by performing the drawing multiple times.

15. The printer according to claim 1,
wherein the second drawing position is a drawing position different from the first drawing position by one pixel in the horizontal direction only, and
wherein the third drawing position is a drawing position different from the first drawing position by one pixel in the vertical direction only.

16. The printer according to claim 1, wherein the data for drawing the character is associated with a predetermined drawing position at which the character is to be drawn, and the conversion unit is configured to convert the drawing result into the display list data associated with the predetermined drawing position.

17. A control method for controlling a printer for processing a character, the control method comprising:
receiving data for drawing a character, wherein the data for drawing the character is a drawing command described in a page description language; and
based on the data for drawing the character, drawing the character multiple times by varying a drawing position of the character each time,
wherein the drawing performed multiple times includes at least drawing at a first drawing position, drawing at a second drawing position different from the first drawing position in a horizontal direction only, and drawing at a third drawing position different from the first drawing position in a vertical direction only; and
converting a drawing result obtained by performing the drawing multiple times into a display list data;
performing rasterization based on at least the display list data to generate a raster image of a page to be printed; and
printing the generated raster image of the page.

18. The control method according to claim 17, wherein characters obtained by drawing the character multiple times overlap each other.

19. The control method according to claim 17, wherein in the drawing, a character is drawn by writing data representing the character.

20. The control method according to claim 17,
wherein the second drawing position is a drawing position different from the first drawing position by one pixel in the horizontal direction only, and
wherein the third drawing position is a drawing position different from the first drawing position by one pixel in the vertical direction only.

21. The method according to claim 17, wherein the data for drawing the character is associated with a predetermined drawing position at which the character is to be drawn, and the conversion unit is configured to convert the drawing result into the display list data associated with the predetermined drawing position.

22. A control method for controlling a printer for processing a character, the control method comprising:
acquiring a drawing command for drawing a character, the drawing command being described in a page description language;
based on the drawing command, drawing the character multiple times at drawing positions different from each other;
converting a drawing result obtained by the drawing into display list data;
performing rasterization based on at least the display list data to generate a rasterized page; and
printing the rasterized page.

23. The control method according to claim 22, wherein the drawing command is associated with a predetermined drawing position at which the character is to be drawn, and the converting converts the drawing result into the display list data associated with the predetermined drawing position.

24. The control method according to claim 22, wherein the different drawing positions include at least a first drawing position, a second drawing position different from the first drawing position in a horizontal direction only, and a third drawing position different from the first drawing position in a vertical direction only.

25. The control method according to claim 22, wherein the drawing result is in a bitmap format.

* * * * *